A. M. OCOBOCK.
Improvement in Carriage Wheels.
No. 123,836.   Fig. 1.   Patented Feb. 20, 1872.
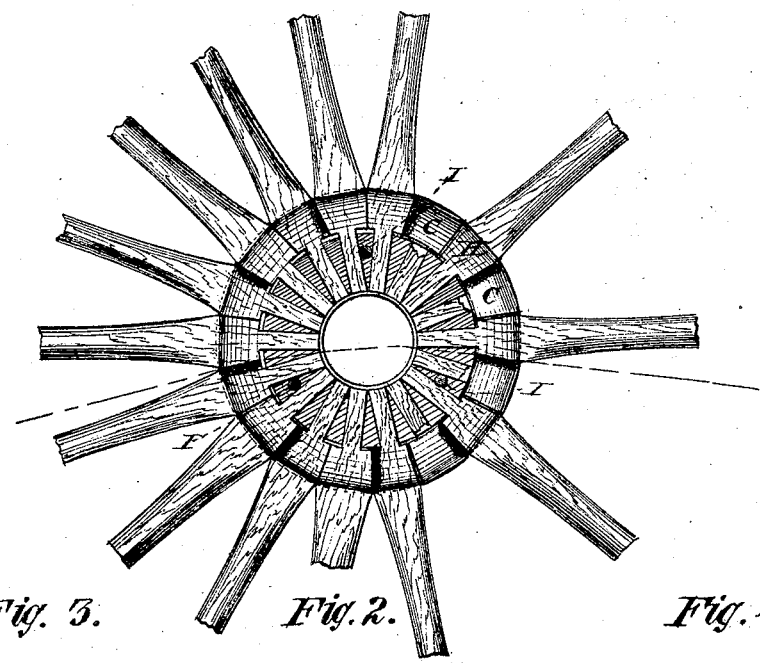
Fig. 3.   Fig. 2.   Fig. 4.
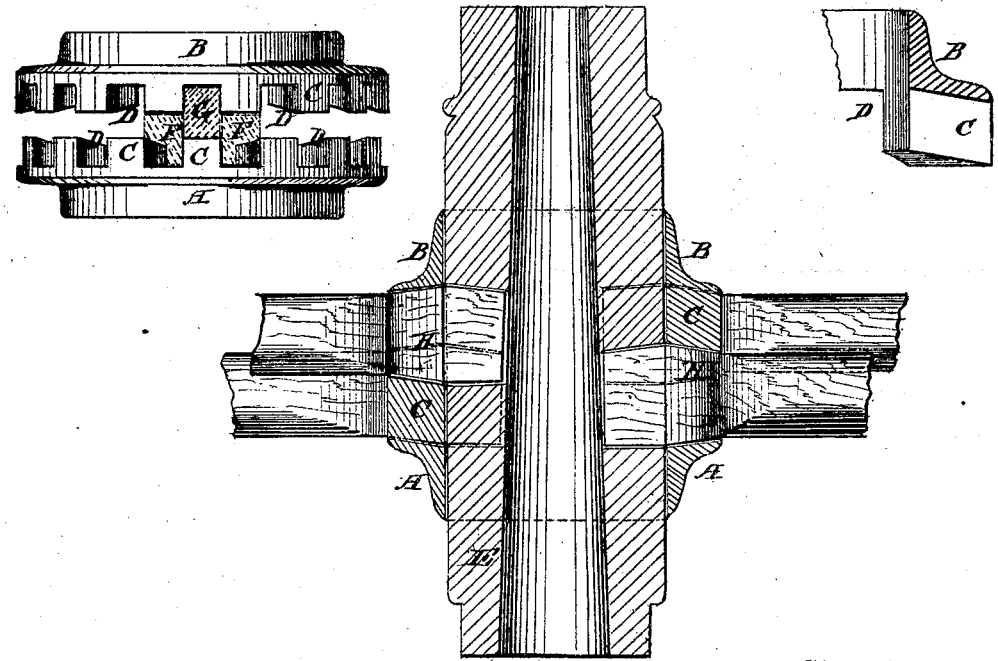
Witnesses:
P. C. Dieterich
Geo. W. Mabee
Inventor:
A. M. Ocobock
PER
Attorneys.

123,836

UNITED STATES PATENT OFFICE.

ALEXANDER M. OCOBOCK, OF TOLEDO, OHIO.

IMPROVEMENT IN CARRIAGE-WHEELS.

Specification forming part of Letters Patent No. 123,836, dated February 20, 1872.

Specification describing a new and useful Improvement in Carriage-Wheel, invented by ALEXANDER M. OCOBOCK, of Toledo, in the county of Lucas and State of Ohio.

My invention consists of a pair of metal collars for fitting on the wood hub and clamping the spokes at the edges, the spokes being arranged alternately right and left, or "dodged," which collars have recesses or projections with under-cut faces, and each receives the alternate spokes in its recesses, while the other spokes fit in the recesses of the other, and the projections of one collar bear against the spokes in the recesses of the other in such manner that each spoke is clamped between a projection of one collar and a recess of another; and the spokes are so dovetailed as to prevent them from working out; and the spaces between each two spokes circumferentially are filled by the projections.

Figure 1 is a transverse section of a hub with one of my collars for clamping the spokes and the spokes applied to it. Fig. 2 is a longitudinal section of the spoke and the two collars. Fig. 3 is a top view of the collar with some of the spokes in section; and Fig. 4 is a section of one of the collars.

A and B represent the two collars, with alternate projections C and recesses D on the faces fronting each other, which are arranged on the hub E, with the projections of one opposite the recesses of the other, to clamp the spokes in the manner clearly shown in Fig. 3 —that is, a projection of collar C clamps a spoke, G, between it and the bottom of a recess in collar B and fills the space between spokes F, except where spokes G lap them; and the projection of the collar B in like manner clamps a spoke, F, into the recess of collar C, and occupies the space between two spokes, G, and the ends of the projections and bottoms of the recesses are under-cut, and the spokes are dovetailed at H, so that they are effectually locked against working out when the collars are bolted together by bolts I or other equivalent devices. The spokes are tenoned into the wood hub similarly to others.

Having thus described my invention, I claim as new and desire to secure by Letters Patent—

The metal collars A B, having recesses D, projections C, and under-cut faces, and the alternate, lapping, and dovetailed spokes F G combined with a wooden hub, as and for the purpose described.

ALEXANDER M. OCOBOCK.

Witnesses:
G. H. NEWMAN,
W. R. CLARK.